Patented Jan. 19, 1937

2,068,371

UNITED STATES PATENT OFFICE 2,068,371

PREPARATION OF ARALKYLAMINO-ANTHRAQUINONE COMPOUNDS

Edwin C. Buxbaum, Shorewood, Wis., assignor to E. I. du Pont de Nemours & Company, Wilmington, Del., a corporation of Delaware No Drawing. Application March 25, 1936, Serial No. 70,891

7 Claims. (Cl. 260—59)

This invention relates to the preparation of new aralkylaminoanthraquinone compounds and to a new and improved process for preparing aralkylaminoanthraquinone compounds generally.

Benzylaminoanthraquinone compounds have heretofore been prepared by reacting nitro, hydroxy, or halogen anthraquinones with benzylamine or by reacting aminoanthraquinone with benzyl halides.

I have found that new and valuable aralkylaminoanthraquinone compounds can be prepared in relatively pure form and in high yields when amino- or nitroanthraquinones are reacted with benzyl or other aralkyl alcohols. The reaction between the nitro- or aminoanthraquinone compound and the aralkyl alcohol may be carried out at temperatures ranging from 100° C. to the reflux temperature of the mass, or approximately 200° C. Inert organic solvents such as nitrobenzene, ortho-dichlorobenzene, etc. may be used as a reaction medium, in which case the use of only a slight excess of the alcohol over that theoretically necessary to complete the reaction is required. Where the nitroanthraquinone is reacted with the alcohol, the reaction is preferably carried out in the presence of an alkali which tends to speed up the reaction. Monobenzylation of polyaminoanthraquinones can be effected by using an amount of benzyl alcohol only slightly in excess of that theoretically required. In such cases the use of an additional solvent is desirable.

The following examples are given to more fully illustrate my invention. The parts used are by weight.

Example 1

Fifty parts of 1,8-diaminoanthraquinone are added to one hundred and fifty parts of benzyl alcohol. The mixture is heated to 190–200° C. for a period of six hours and then cooled to 70° C. The mass is diluted with an equal volume of ethyl alcohol and filtered. The violet brown crystals of 1,8-di-(benzylamino)anthraquinone formed are washed with ethyl alcohol and then dried. The crystals dissolve in organic solvents with a violet color.

Example 2

One hundred parts of 1,4,5,8-tetraminoanthraquinone are suspended in four hundred parts of benzyl alcohol. The mass is refluxed around 200° C. for four hours and cooled to 65° C. About eight hundred parts of methyl alcohol are added and the mixture held at 50° C. for one hour. The mass is filtered, washed and dried. The 1,5-di-(benzylamino)-4,8-diaminoanthraquinone which is obtained dyes cellulose acetate silk brilliant greenish blue shades of excellent fastness to light.

Example 3

Fifty parts of 1,8-diamino-4,5-dihydroxyanthraquinone are added to one hundred and fifty parts of nitrobenzene under good agitation. Seventy-five parts of benzyl alcohol are added and the mixture refluxed at a temperature of 200° C. for three hours. The mixture changes shade to a bright greenish blue while at the same time water vapor comes off. The mixture is cooled to 60° and diluted with ethyl alcohol, filtered and sucked dry. After the nitrobenzene is completely removed, the dark blue 1,8-di-(benzylamino)-4,5-dihydroxyanthraquinone is dried at 100°. It is a dark blue powder and dissolves easily in benzol, toluol and in gasoline to a bright greenish blue. The same product may be obtained by the following procedure:

Twenty-five parts of 1,8-diamino-4,5-dihydroxyanthraquinone are added to one hundred parts of benzyl chloride under good agitation. Ten parts of sodium carbonate are added and the mixture heated to 140° C. for one hour and thirty minutes. The reaction mass changes color rapidly to a greenish blue. The solution is cooled to 60° C. and diluted with three hundred parts of ethyl alcohol. The diluted mixture is agitated at 30° for two hours and filtered. The cake is washed with three hundred parts of ethyl alcohol and then with three hundred parts of hot water and dried. The 1,8-di-(benzylamino)-4,5-dihydroxyanthraquinone so obtained dissolves in benzol and gasoline with a bright greenish blue shade.

Example 4

Twenty-five parts of 1-amino-2-bromo-4-toluidoanthraquinone are suspended in one hundred parts of benzyl alcohol. The temperature of the mass is raised to 200° C. and held at this temperature for 8 hours. After about ½ hour the color of the reaction mass becomes a greenish blue. The mass is cooled and diluted with ethyl alcohol, filtered and washed with ethyl alcohol until free of benzyl alcohol. The 1-benzylamino-2-bromo-4-toluidoanthraquinone so formed is a dark blue powder soluble in benzene or gasoline with a greenish blue color.

Example 5

Fifty parts of 1,8-dimethoxy-4,5-diaminoanthraquinone are suspended in one hundred and fifty parts of benzyl alcohol and refluxed for three hours. The solution becomes a violet shade and is then cooled, diluted with alcohol and isolated in the usual manner. The resulting product is substantially pure 1,8-dimethoxy-4,5-di-(benzylamino)-anthraquinone.

*Example 6*

One hundred parts of 1-nitro-2-methylanthraquinone are suspended in five hundred parts of benzyl alcohol. To the above mixture add eighty-six parts of sodium carbonate. The mixture is then refluxed for two hours. The colorless mixture soon starts turning brown and gradually takes on an orange hue. When the reaction is completed the mass is cooled to 90° C. and the benzyl alcohol is removed by steam distillation. The orange compound formed is 1-benzylamino-2-methylanthraquinone which dyes cellulose acetate in bright orange shades fast to light.

*Example 7*

Fifty parts of 1-nitroanthraquinone are suspended in three hundred parts of benzyl alcohol. To the above mixture forty parts of sodium carbonate are added. The mass is refluxed for two hours. The colorless mixture soon starts turning brown and gradually assumes a red color. When the reaction is completed the mass is cooled to 90° C. and the benzyl alcohol is removed by steam distillation. The 1-benzylaminoanthraquinone formed is an orange red compound which dyes cellulose acetate in red shade.

*Example 8*

Fifty parts of 1,8-diamino-4,5-dihydroxyanthraquinone are suspended in one hundred and fifty parts of nitrobenzol and twenty-two parts of benzyl alcohol are added. The mixture is heated to 170-175° C. for thirty minutes during which time the reaction mixture turns rapidly from a violet to a greenish blue shade. The mixture is cooled rapidly to 60° C. and diluted with alcohol in the usual manner. The 1-benzylamino-8-amino-4,5-dihydroxyanthraquinone so formed dyes celanese silk a reddish blue.

*Example 9*

Twenty-five parts of 1,8-diamino-4,5-dihydroxyanthraquinone are heated with one hundred parts of phenyl ethyl alcohol to a reflux temperature for one hour. The greenish blue solution is cooled to 60° C. and diluted with alcohol and isolated in the usual manner. The 1,8-di-(phenyl ethylamino)-4,5-dihydroxyanthraquinone so obtained is soluble in organic solvents like benzene, gasoline or toluene, with a blue color.

*Example 10*

Thirty parts of 1,8-dihydroxy-4,5-dinitroanthraquinone are mixed with twenty parts of sodium carbonate and two hundred parts of benzyl alcohol. The mixture is heated to a reflux until there is no further color change. The red solution is cooled to 90° and steam distilled. The 1,8-dihydroxy-4-benzylamino-5-nitro compound which is formed dissolves with a red color in organic solvents.

Other alkali metal carbonates or bicarbonates may be substituted for the sodium carbonate mentioned in the specific examples. In place of benzyl alcohol other aralkyl alcohols, such as phenyl ethyl alcohol, phenyl propyl alcohol, or nitro-benzyl alcohol may be used to produce the corresponding aralkylaminoanthraquinone compounds.

The reaction of the aralkyl alcohol on amino- and nitroanthraquinones offers the advantage that in the reaction water and not HCl is the product of the condensation and this distills off, leaving a product which is readily isolated from the solvent employed. The use of the nitroanthraquinone compound in place of the aminoanthraquinone eliminates the separate step of reducing the nitro group to the amine which is necessary where the aralkyl halides are used.

I claim:

1. Compounds of the following general formula

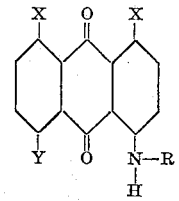

wherein both X's represent a member of the group consisting of hydroxy and alkoxy radicals, R represents an aralkyl radical and Y stands for a radical of the group consisting of $NO_2$, $NH_2$ and NH—R wherein R has the same significance as above.

2. 1,8-dihydroxy-4,5-di-(benzylamino)-anthraquinone.

3. 1-benzylamino-4,5-dihydroxy-8-aminoanthraquinone.

4. 1-benzylamino-4,5-dihydroxy-8-nitroanthraquinone.

5. The process which comprises heating a compound of the class consisting of alpha-nitro- and alpha-aminoanthraquinones with an aralkyl alcohol to reaction temperature.

6. The process which comprises heating an aminoanthraquinone with an excess aralkyl alcohol to the reflux temperature of the mass.

7. The process which comprises heating an aminoanthraquinone with an aralkyl alcohol in an inert organic solvent at approximately the reflux temperature of the mass, the amount of aralkyl alcohol used being only slightly in excess of that theoretically necessary to give the desired aralkylaminoanthraquinone.

EDWIN C. BUXBAUM.